Dec. 20, 1960  J. F. HARPER  2,964,883
BUFFING MACHINERY
Filed Jan. 27, 1954  9 Sheets-Sheet 1

INVENTOR
JOHN F. HARPER
BY John B. Willard
ATTORNEY

Dec. 20, 1960  J. F. HARPER  2,964,883
BUFFING MACHINERY
Filed Jan. 27, 1954  9 Sheets-Sheet 3

INVENTOR
JOHN F. HARPER
BY John B. Willard
ATTORNEY

Dec. 20, 1960    J. F. HARPER    2,964,883
BUFFING MACHINERY

Filed Jan. 27, 1954    9 Sheets—Sheet 4

INVENTOR
JOHN F. HARPER
BY John B. Willard
ATTORNEY

Dec. 20, 1960   J. F. HARPER   2,964,883
BUFFING MACHINERY

Filed Jan. 27, 1954   9 Sheets-Sheet 5

INVENTOR
JOHN F. HARPER
BY John B. Willard
ATTORNEY

Dec. 20, 1960  J. F. HARPER  2,964,883
BUFFING MACHINERY

Filed Jan. 27, 1954  9 Sheets-Sheet 6

INVENTOR
JOHN F. HARPER
BY John B. Willard
ATTORNEY

Dec. 20, 1960   J. F. HARPER   2,964,883
BUFFING MACHINERY
Filed Jan. 27, 1954   9 Sheets-Sheet 7

INVENTOR
JOHN F. HARPER
BY John B. Willard
ATTORNEY

Dec. 20, 1960  J. F. HARPER  2,964,883
BUFFING MACHINERY
Filed Jan. 27, 1954  9 Sheets-Sheet 8

INVENTOR
JOHN F. HARPER
BY John B. Willard
ATTORNEY

Dec. 20, 1960  J. F. HARPER  2,964,883
BUFFING MACHINERY
Filed Jan. 27, 1954  9 Sheets-Sheet 9

INVENTOR
JOHN F. HARPER
BY John B. Willard
ATTORNEY

United States Patent Office 2,964,883
Patented Dec. 20, 1960

2,964,883
BUFFING MACHINERY
John F. Harper, Ames Hollow Road, Portland, Conn.
Filed Jan. 27, 1954, Ser. No. 406,428
9 Claims. (Cl. 51—76)

The present invention relates to buffing machines and has for a principal object the provision of a high production automatic machine for deburring, polishing and buffing all types and shapes of articles.

A further object is the provision of a high production and low cost machine having the necessary strength and durability for long and hard usage.

Another object is the provision in such a machine of polishing heads adjustably mounted for complete flexibility and adaptability to every possible position and portion of a work piece. More particularly, each head is adjustably mounted so that its buff may be advanced in any selected plane desired to compensate for buff wear and so that a smaller worn buff engages the same surface area of a work piece as a new and unworn larger buff.

Another object is to provide automatic precision wheel controls including a gage which indicates the load on the buff wheel.

A still further object is the provision of a push-button controlled means for advancing the buffing head and its buff when the buff wears and the load drops so as to increase the buff load to a selected value while maintaining the angular relationship and the line of contact of the buff and the work-piece and to effect the advancement in a selected plane of movement for the buff.

A further object is to provide individual power and overhead suspension for each buff head and to provide such heads having substantially perfect balance regardless of angular setting or adjustment.

A still further and more specific object is to provide a buff head having a yoke mounting adjustable through 360° and carrying a swivel mounting indexably rotatable through approximately 210° about an axis at right angles to the axis of the yoke and further providing angular adjustment for the axis of the yoke into any desired position.

Another object is to provide a buff head having an improved buffing compound applicator for automatically applying cold compound uniformly to the buff along the same line of application and including an adjustment with which to regulably preselect a desired quantity for repetitive application.

A further object is to provide a buffing machine having an endless conveyor which moves work at a constant table height throughout its entire travel.

Another object is to provide such a conveyor with straight side and quarter turn corner sections which may be readily changed in length and plan by the addition or removal of standard units.

A further object is to provide an overhead frame which can be readily enlarged to accommodate enlargement of the conveyor and any number of additional buff heads.

Another object is to provide an endless conveyor with which movement of the work may be varied at each successive wheel and, more specifically, to provide separate, individually controlled spindle-mounted and operated holders for the work so that each work piece automatically may be made to rotate in any direction and at any desired speed or, selectively, to tail-wag, oscillate or take any motion or combination of motions and at any angular position or positions relative to the buff and to the conveyor travel.

Buffing machines embodying the present invention provide complete flexibility of work movement and arrangement relative to the buffs and have the ability to perform the work of continuous rotary, indexing rotary and straight line conventional machines as well as all combinations of work to which the three types are each individually limited.

Still another object is to provide a drive for the conveyor which is virtually shock proof in operation including starting and stopping of the conveyor.

Another object is to provide a conveyor drive which is selectively continuous or intermittent in any desired pattern.

A further object is to provide safety controls which interrupt all operation of conveyor and buffs when the compound of an applicator is exhausted.

Still another object is to provide a frame of the type indicated which provides support for buff heads on either or both sides of the conveyor at the same buff wheel station.

The present invention has the further advantage of providing substantial savings in cost of wheels and compound in addition to operating efficiency and economy per unit of work.

The further advantage is provided of ease of accessibility to all parts, components and points of machines embodying the invention so that repairs, alterations and change-overs, as well as loading and unloading, may be effected with ease in a minimum of time.

The present invention makes contoured buffs generally unnecessary.

Other objects and advantages are pointed out or will be apparent from the following description of an embodiment of the invention illustrated in the accompanying drawings in which:

Figure 1:
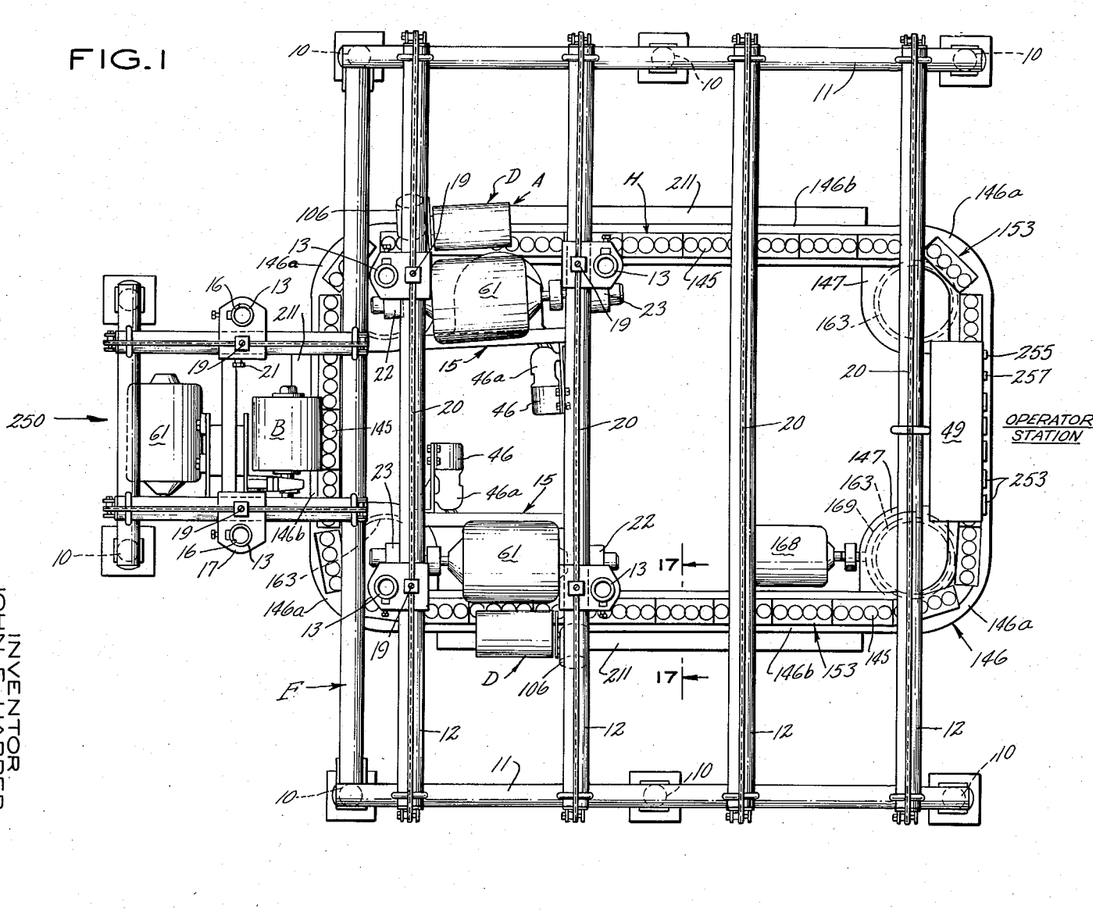
Figure 1 is a top plan view of a buffing machine including an overhead frame support for a plurality of buff wheel assemblies which are adjustably located for operation in selected positions relative to a traveling endless table conveyor for work.
Figure 2:
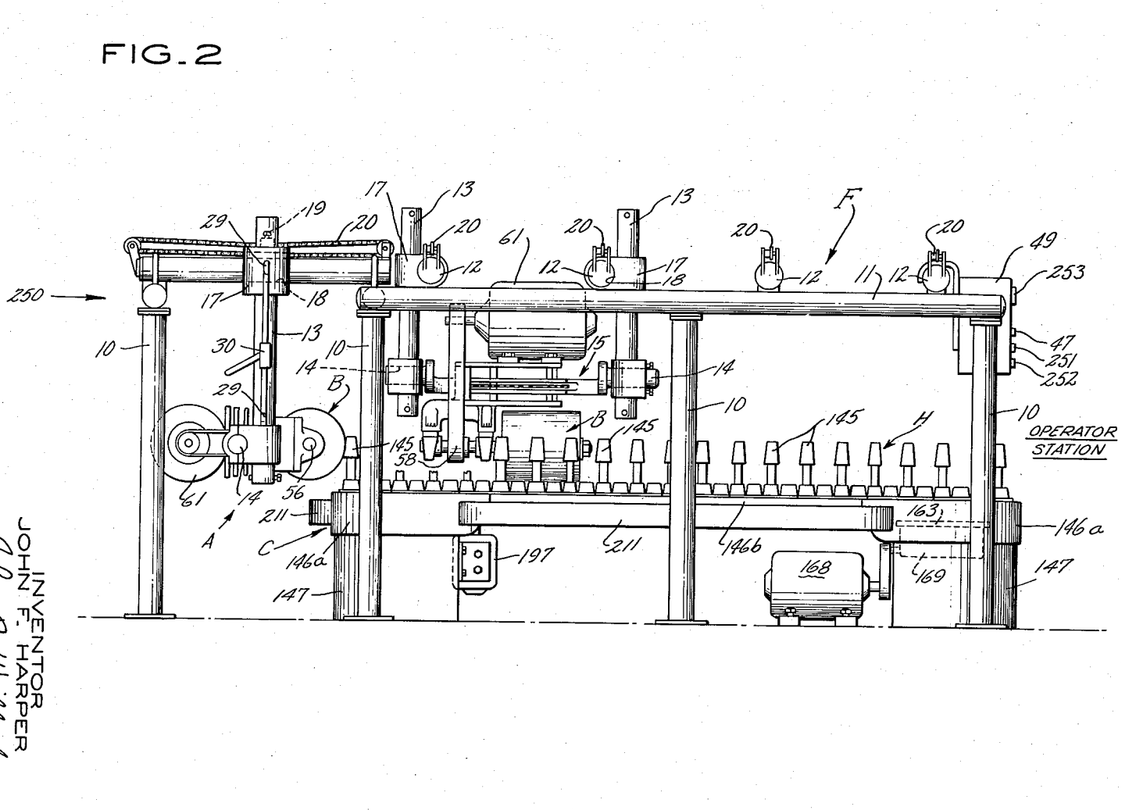
Fig. 2 is a side elevation view of the buffing machine shown in Fig. 1.

Referring to Figs. 1 and 2 of the drawings, the buffing machine there shown includes a frame generally designated F which operably supports a number of buff head assemblies, each of which is generally designated A, and has a buff wheel B which is rotated in buffing contact with work presented by holders H on an endless conveyor table generally designated C.

Referring more particularly to frame F, it includes a number of vertical posts 10 to the upper ends of which are secured a pair of parallel spaced horizontal rigid tubular frame members 11 at right angles to which are secured the ends of a number of horizontal parallel tubular members 12.

Four such members 12 are provided in the illustrated embodiment although it will be understood that a greater or lesser number may be provided as the requirements of individual installations may dictate.

Preferably each member 12 is equally spaced from adjacent members 12 so that each pair of adjacent members 12, 12 are properly located to support a pair of depending tubular supports 13, 13 to the lower ends of which the ends 14, 14 of an aluminum or other light weight yoke or trunnion, generally designated 15, are adjustably secured.

More particularly, each of the supports 13 is supported at its upper end in a bore 16 of a block 17 that is slidably adjustable on the transverse overhead horizontal bars 12 by means of bore 18. Preferably, the axes of the bore 16 and 18 are spaced apart and at right angles to each other so that the supports 13 are always in vertical planes regardless of the positions to which they are adjusted.

Each block is releasably securable by means of a thumb screw or other suitable fastener 19 to an endless chain 20 which extends the length of each tubular bar 12 and provides means for moving the block 17 to a selected position of adjustment on the transverse bar 12 at which position the block may be releasably locked by set screws 21.

Similar blocks 22 and 23 are located on the lower ends of each pair of supports 13 and provide slidably and rotatably adjustable support for the elongate ends 14, 14 of the yoke 15. The blocks 22 and 23 are identical save that a bracket 24a which rotatably supports a worm 24 is secured by screws 24b to the former and not to the latter. Each of the blocks 22 and 23 includes a bore 25 for adjustably supporting the block on its support 13 and bolts 26 for locking the block in a selected position of adjustment on the bar 13. The blocks 22 and 23 are each provided with split bearing bores 27 in which the ends 14 of the yoke 15 are mounted at right angles to the bars 13 for slidable and rotatable movement and which include bolts 27a for clamping the split bearing 27 on the yoke ends 14 in a desired position of adjustment.

Figure 4:
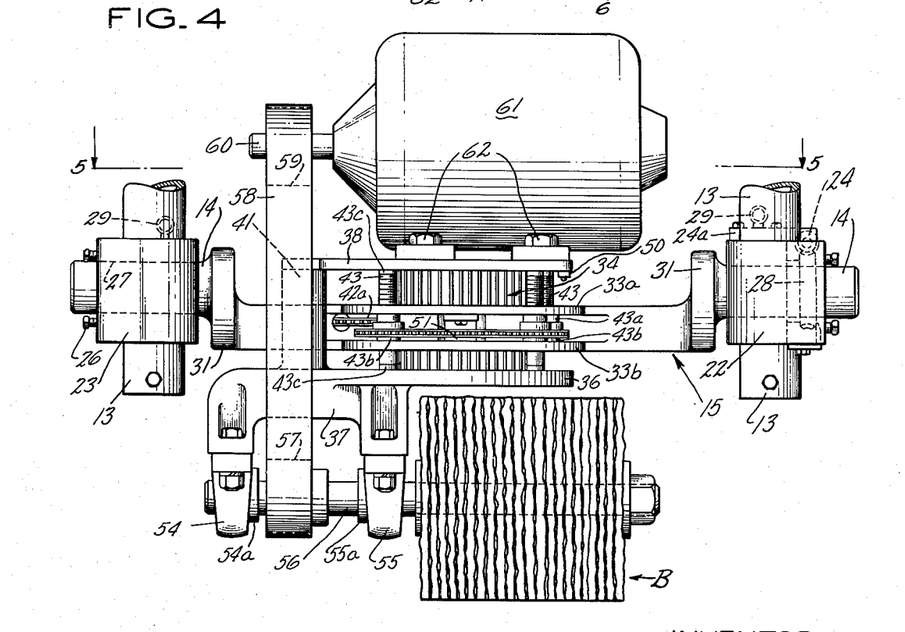
Fig. 4 is an elevation view taken generally from the right of Fig. 3 with the applicator removed so as to more clearly show details of a drive for advancing the buff.

As shown in Fig. 4, one of the ends 14 of the yoke is provided with a worm wheel 28 that operatively engages the worm 24 by means of which the yoke 15 may be rotated to and held in a desired position of adjustment.

As shown in Figs. 1 and 2, each of the blocks 17 supports, as by means of eyes 29 and an individual chain hoist 30, the block 22 or 23 located beneath it so that the blocks 22 and 23 may be raised and lowered readily on or with its bar 13 to desired positions of adjustment for the yoke 15.

Figures 3, 6, 7, 8, 14:
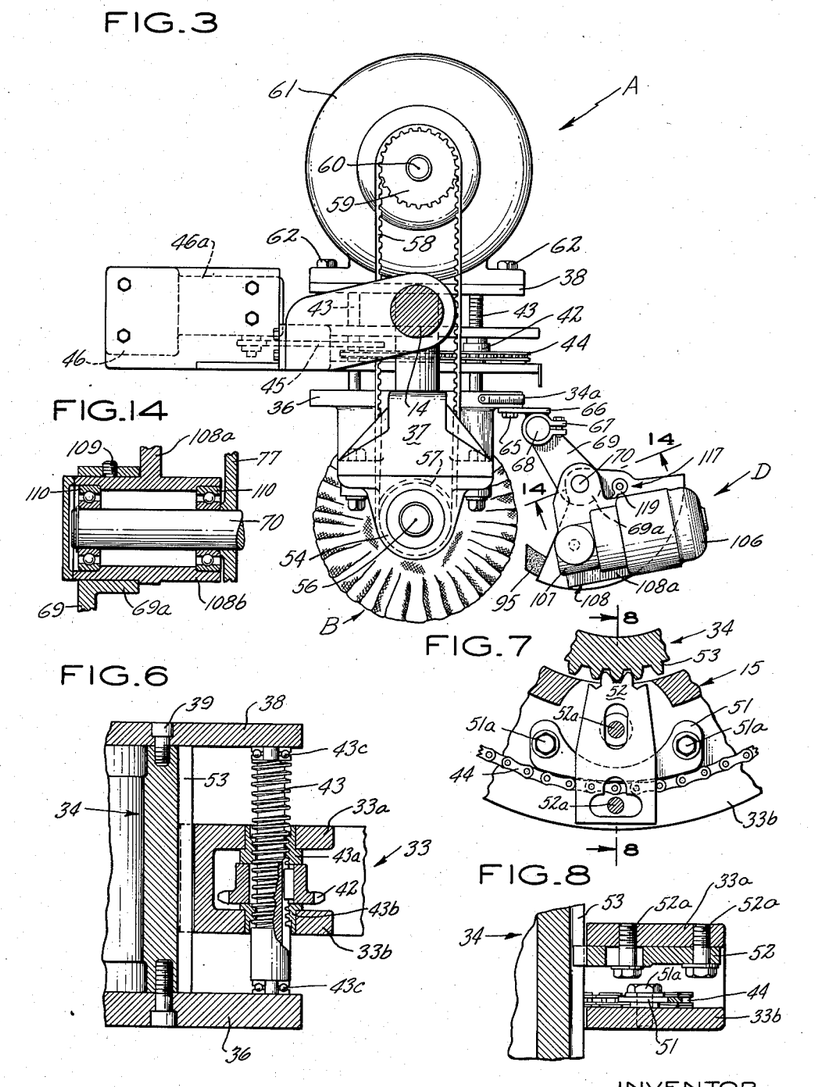
Fig. 3 is an enlarged view of a buff head assembly including a supporting yoke, a buff wheel, and a compound applicator.
Fig. 6 is an enlarged cross-sectional view taken on line 6—6 of Fig. 5 showing jack screw details of the drive for advancing the buff.
Fig. 7 is an enlarged view partly in cross-section of a portion of Fig. 5 showing further details of the lock for the indexable buff turret and an adjustable shoe for tightening the chain of the drive for advancing and retracting the buff turret.
Fig. 8 is a cross-sectional view taken on line 8—8 of Fig. 7.
Fig. 14 is an enlarged cross-sectional view taken generally on line 14—14 of Fig. 3 and showing the mounting bracket for the applicator.
Figure 5:
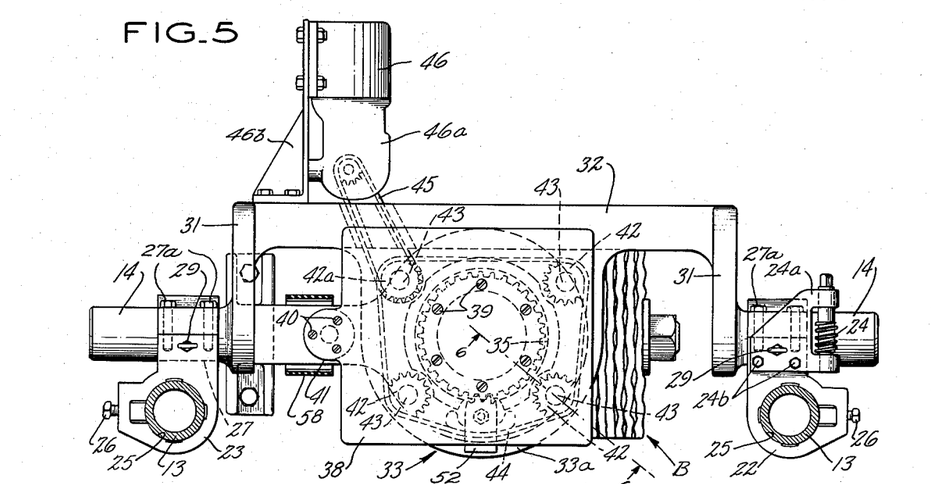
Fig. 5 is a view taken generally on line 5—5 of Fig. 4 with the motor removed and showing buff indexing and locking components and a motor drive for advancing the buff wheel.

As shown in Figs. 3–5, the yoke or trunnion 15 includes a pair of spaced arm portions 31, 31 which are adjacent the ends 14, 14 and are connected by a supporting section 32 having a central plate portion 33 offset from the common axis of the yoke ends 14. The plate 33 adjustably carries a cylindrical turret member 34 that extends through and is slidably supported in a bore 35 in the plate 33 and to the opposite ends of which are fastened a mounting plate 36 of a bearing bracket 37 for the buff wheel B and a spaced mounting plate 38 for the motor 61 which drives the buff.

More particularly, the spaced plates 36 and 38 in addition to being fixedly secured to the ends of the cylindrical member 34, as by means of screws 39, are also secured by screws 40 to a reinforcing post 41.

As shown in Figs. 4 and 5, the plate 33 has spaced portions 33a and 33b between which are located a number of sprockets 42 that are spaced about the member 34 and slidably keyed on threaded jack screws 43, the ends of which carry antifriction bearings 43c that press against the plates 36 and 38. On opposite sides of each of the several sprockets 42 are a pair of nuts 43a and 43b which non-rotatably press against the respective portions 33a and 33b of the plate 33. The sprockets 42 are connected by an endless chain 44 so that rotation of one effects a corresponding rotation of all the sprockets 42 and effects advancement or retraction of the jack screws 43 relative to the nuts 43a and 43b which are secured against travel by their non-rotatable engagement with the plate 33. The screws 43, in turn, smoothly advance or retract the bearing bracket 37 for the buff wheel B. Limit switches 50 are provided to prevent excessive travel of the buff B in either direction.

In order to effect rotation of the sprockets 42, one of the sprockets is secured, as shown in Fig. 5, to a second sprocket 42a that is operatively connected by a chain 45 with a motor 46 and speed reducer 46a which are adjustably mounted on a bracket 46b secured to the yoke 15. The motor 46 may be selectively operated in either direction by manual operation of a directional selector switch 47 on control panel 49 (Fig. 21) so that minute advancement of the turret 34 may be effected readily to compensate for wear of the buff.

Preferably a limit switch 50 is secured to the yoke plate 33a for engagement and operation by the motor support plate 38 when the turret moves to the limit of its forward travel. The limit switch 50 serves to interrupt all current to the motor 46 by opening a switch (not shown) when the buff B reaches the permissible limit of forward travel.

As shown in Figs. 7 and 8, the chain 44 for the sprockets 42 rides on a shoe 51, the position of which may be varied on the plate 33b, by adjustment of screws 51a, so as to tighten or slack the chain 44 as desired.

Indexing of the buff turret 34 to a desired position relative to the yoke plate 33 may be effected by manually rotating the member 34 and locking it in the selected position with a lock plate 52 which is secured by screws 52a to the plate 33. The plate 52 engages the fluting on the outer surface of the turret 34 so as to prevent rotary movement of the turret from the indexed position while permitting advancement and retraction of the turret and buff B.

As shown in Figs. 3–5, the bracket 37 for the buff B includes a pair of spaced bearing blocks 54 and 55 in which are secured suitable bearings 54a and 55a, respectively, for a buff spindle 56 for the buff B. Secured to the spindle 56 intermediate the bearing blocks 54 and 55 is a drive pulley 57 which is driven by an anti-slip gear type belt 58 from the pulley 59 on shaft 60 of a motor 61 which is mounted by suitable screw fasteners 62 on the turret plate 38.

It will be apparent that adjusting the turret 34 by indexing or by buff advancement or retraction does not disturb the adjustment of the buff drive in any way. As is apparent from Fig. 5, the turret 34 may be indexed through approximately 210° without the belt 58 engaging the yoke cross member 32. If desired, the belt 58 may be removed and replaced on the pulleys 57 and 59 on the opposite side of the yoke member 32 and indexing the turret beyond its customary 210° range.

Preferably the buff B is centered generally on the axis of the turret 34 and the load of the buff assembly A including the buff B and motor 61 is distributed on the yoke 15 so that the buff assembly is generally in balance about the axis of its ends 14, regardless of the positions of adjustment of the yoke 15 and turret 34 within the travel range of the turret 34.

Figure 9:
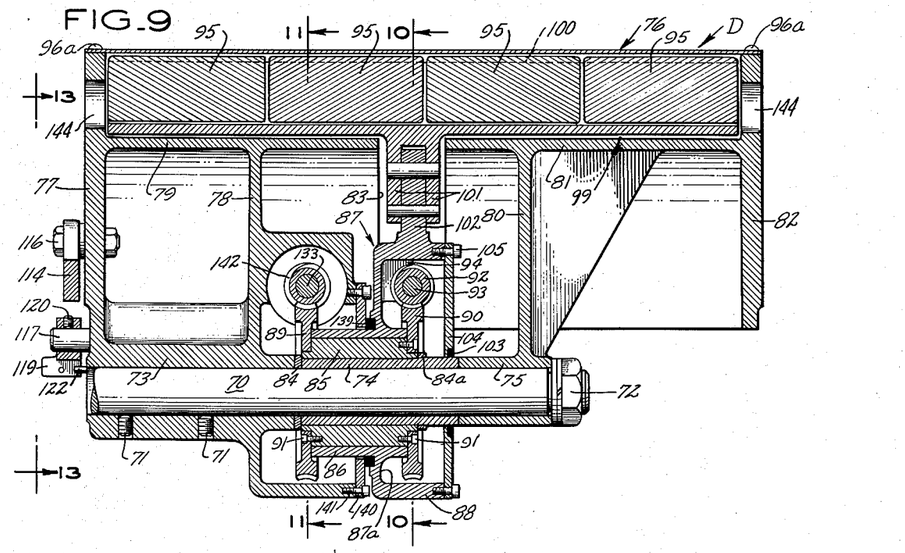
Fig. 9 is an enlarged cross-sectional view of the compound applicator taken generally on line 9—9 of Fig. 10.

Referring more particularly to the compound applicator D which automatically repeats application of buffing compound to the rotating buff, the turret plate 36 of the buff bracket 37, as shown in Fig. 3, fixedly carries as by means of bolts 65 a bracket 66 having a split ring portion 67 in which shaft 68 of a support for the applicator D is adjustably secured. As shown in Figs. 3 and 9, from the end of the shaft 68 projects an arm 69 in outer end 69a of which is rotatably secured a shaft 70 that parallels the shaft 68 and the buff spindle 56. Secured to the shaft 70 as by set screws 71 and nut 72 are the hub portions 73, 74 and 75 of an arcuate housing generally designated 76 in which buffing compound cakes 95 are adjustably secured.

As shown in Fig. 9, the housing 76 has two principal castings one of which includes the hub 73 from which radially extend a pair of spaced parallel segmental walls 77 and 78 connected by a curved cylindrical wall 79. The other principal casting includes the hub 75 and a radially extending wall 80 having a curved cylindrical wall 81 on the outer end of which is formed an end wall 82 parallel with and spaced from the wall 80. The cylindrical walls 79 and 81 are disposed at equal radial distance from the axes of their respective hubs 73 and 75 which, when assembled on the shaft 70, are spaced apart by the hub 74 so that there is a space or passage 83 between the walls 79 and 81.

Rotatably secured between rings 84, 84a on the hub 74 is a sleeve 85 on which is rotatably mounted a hub 86 of a generally cylindrical housing, generally designated 87, which includes a circular end wall portion 87a and a circular peripheral wall portion 88. A pair of spaced worm wheels 89 and 90 are secured by screws 91 to the opposite ends of the sleeve 85 and loosely bear on the ends of the hub 86 so as to restrict the latter to rotary movement on the sleeve 85.

The rotary movement of the hub 86 relative to the sleeve 85 is limited by a worm 92 which operatively engages the worm gear 90 and which is fastened to a shaft 93 that is rotatably journaled in a bearing bracket portion 94 of the housing 87.

Figure 10:
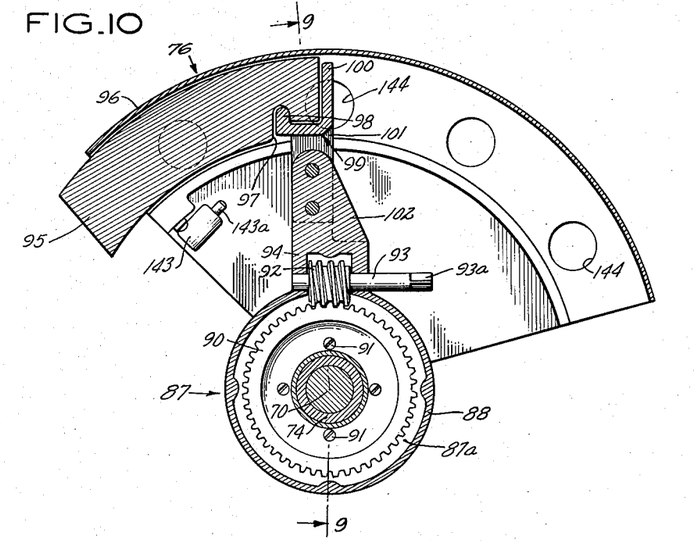
Fig. 10 is a cross-sectional view taken on line 10—10 of Fig. 9 showing details of the reset for the compound applicator.

As shown in Fig. 10, the shaft 93 extends out of the housing 87 and is provided with a square end 93a upon which a wrench may be placed to turn the pin 93 and "walk" the worm 92 with its housing 87 and bracket 94 about the worm gear 90 and thereby adjust the distance which compound cake sections 95 project from the applicator housing 76.

More particularly, the cake sections 95 are curved to conform to the curvature of the walls 79 and 81 on which the cakes are slidably secured between the end walls 77 and 82 by an outer conforming cylindrical cover 96 fastened by screws 96a to the arcuate outer peripheries of the walls 77 and 82. Each curved cake section 95 is grooved as at 97 to receive a projecting forward lip portion 98 of a channel 99 which extends transversely the entire width of the applicator housing 76 and the longer rear leg portion 100 of which bears against the adjacent rear ends of all of the cake sections 95.

As shown in Figs. 9 and 10, the channel 99 is mounted for travel in an arcuate path adjacent the housing walls 79 and 81 by a depending yoke portion 101 which is pinned to an external arm portion 102 radially projecting from the bracket 94 of the housing 87 within the arcuate passageway 83. Preferably the interior of the housing 87 is packed with grease and made substantially dust and dirt-proof by a rubber gasket ring 103 and a circular side wall 104 which is removably secured by screws 105 to the periphery of the wall 88 and bracket 94 of the housing 87.

Arcuate oscillation of the shaft 70 and housing 76 about the axis of the shaft 70 to move the compound cakes 95 into and out of contact with the buff B is effected by an electric motor 106 and speed reducer 107 which are mounted on a plate 108a of a bracket 108 having a hub portion 108b that is secured by a set screw 109 in any desired position of angular adjustment in sleeve 69a on the outside end of the bracket arm 69. As shown in Fig. 14, the shaft 70 is rotatably journaled in bearings 110 within the hub portion 108b of the bracket 108.

The speed reducer 107 includes a drive shaft 111 which extends through the plate 108a and to the end of which is secured a crank arm 112, the outer end of which is rotatably secured by pin 113 to one end of a connecting rod 114, the other end of which is pivotally secured by a pin 116 to the side wall 77 of the housing 76 at a point removed from the shaft 70.

Rotation of the crank 112 acts through the connecting rod 114 to oscillate back and forth the front end of the applicator housing 76 from which the compound cake 95 projects from a forward position in which the cake engages and applies compound to the periphery of the buff B to a rearward position at which the cake is substantially removed from the hot buff. The extent of the rearward movement is particularly important in that the cake 95 has the opportunity to cool following each application to the buff B. Consequently, the compound always is applied relatively cold and with a substantial savings in compound and its effectiveness over compound applied hot.

In accordance with the present invention, means are provided for automatically advancing the compound cakes 95 from the applicator 76 following each application to the buff B so as to compensate for the compound removed from the cakes 95 by the buff.

Figure 11:
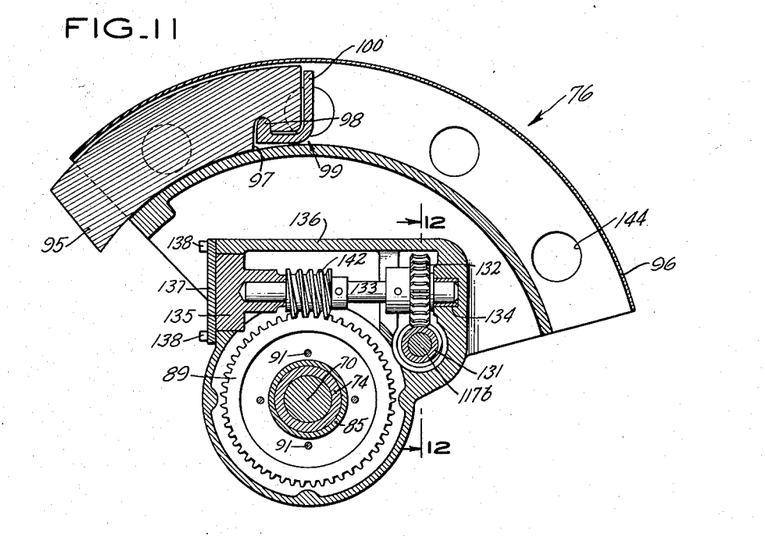
Fig. 11 is a cross-sectional view similar to Fig. 10 and taken on line 11—11 of Fig. 9 showing details of the feed mechanism of the applicator.
Figure 12:
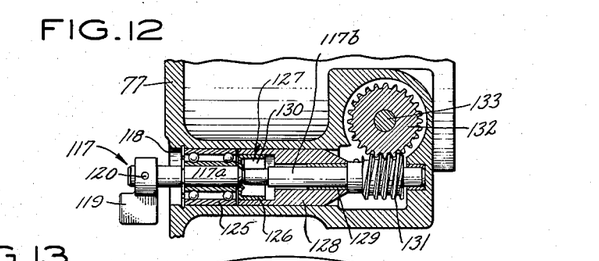
Fig. 12 is a cross-sectional view taken on line 12—12 of Fig. 11 showing additional details of the automatic feed drive of the applicator.
Figure 13:
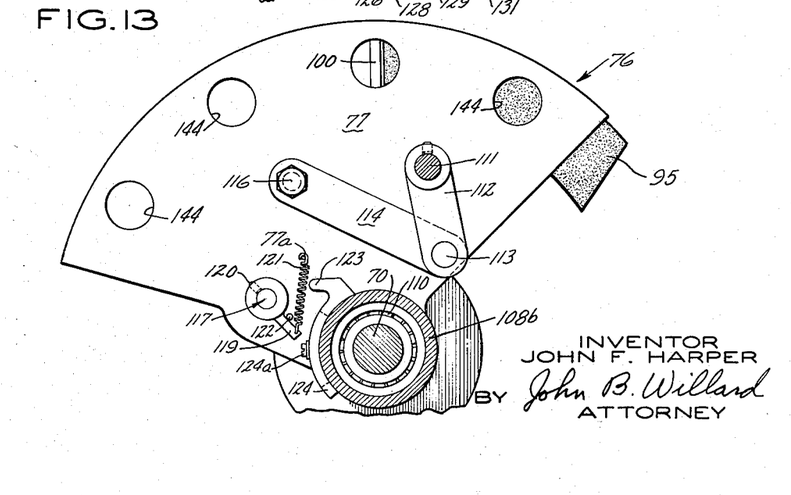
Fig. 13 is a view partly in cross-section of the applicator as seen from the left of Fig. 9 showing compound cake advancing mechanism.

More particularly, as shown in Figs. 11–13, the applicator is provided with a shaft 117 which is rotatably journaled in a bore 118 within a protruding portion of the hub 73. The shaft 117 is parallel to and offset from the main shaft 70 of the applicator. A crank arm 119 is adjustably secured by set screw 120 to the outer end of the shaft 117 and a spring 121 is tensioned between the arm 119 and an anchor lug 77a on the end wall 77 so that the shaft 117 is resiliently urged clockwise as viewed in Fig. 11 and counterclockwise against a stop pin 122 as viewed in Fig. 13.

Advancement of the compound cake 95 is effected by clockwise (Fig. 13) movement of the crank 119 and shaft 117 which is effected by clockwise (Fig. 13) movement of the applicator 76 to its forward or compound applying position.

More particularly, the crank 119 engages and is swung against the tension of the spring 121 from its normal position against the stop pin 122 by a finger 123 on the end of a slotted arcuate plate 124 which is adjustably secured to the hub 108b of the motor mounting bracket 108 by a screw 124a.

As shown in Fig. 12, the shaft 117 is in two coextensive lengths, the outer portion 117a of which is rotatably secured by a ball race 125 in the bore 118. Secured to the inner end of a portion 117a is a cylindrical cup member 126 of a one-way clutch, generally designated 127. Concentrically located within the cup 126 is an end of an inner shaft length 117b which is rotatably journaled in clutch housing 128 and sleeve 129. The shaft 117b is advanced only in the clockwise direction (Fig. 11) by rollers 130 responsive to rotation of the cup 126 in the same direction by the engagement of the finger 123 with the crank 119 on the outer shaft length 117a.

Rotation of the shaft 117a and crank 119 in the opposite direction by the spring 121 into engagement with the stop 122 when the applicator 76 swings rearwardly and the crank 119 disengages the finger 123 does not effect corresponding rotation of the inner shaft length 117b because the rollers 130 roll out of driving engagement with the cup 126 and shaft 117b.

Pinned to the inner end of inner shaft length 117b is a worm 131 which meshes with a worm gear 132 secured on a shaft 133 the ends of which as shown in Fig. 11 are rotatably supported by a sleeve 134 and a removable bearing 135 within a housing portion 136 on the applicator hub 73 (Fig. 9).

As shown in Fig. 11, a plate 137 is fastened by screws 138 to the housing 136 and removably secures the bearing 135 in place. The plate 137 together with a gasket 139 and a plate 140 which is removably fastened by screws 141 to the housing 136 (Fig. 9) provides for packing the housing with grease and making it substantially dust-proof.

Rotation of the worm 131 rotates the worm gear 132 and the shaft 133 to which is pinned a worm 142. The worm 142 engages and rotates the worm gear 89 together with the sleeve 85 and gear 90 to which the gear 89 is secured. Rotation of the gear 90 effects a corresponding rotation of the housing 87 through the interlocking worm 92 and thereby minutely advances the cake drive bracket 99 and the compound cake 95 responsive to only slight angular rotation of the drive shaft 117 and crank 119.

It will be apparent that the position of the finger 123 may be adjusted by means of the screw 124a to thereby vary the angular advancement of the shaft 117 and of the compound cake 95 for each oscillatory stroke of the applicator 76. Thus, the rate at which the compound is applied to the buff B may be preselected as necessary for the particular requirements of each type of work piece.

As shown in Fig. 10, a limit switch 143 may be mounted on the applicator housing 76 for operation by the compound cake drive arm 102 so that when the compound is exhausted the arm will engage the switch button 143a and open a main switch (not shown) and thereby interrupting the power to the machine.

Preferably, as shown in Figs. 9 and 10, the end plates 77 and 82 of the applicator are provided with openings 144.

Referring more particularly to the conveyor C and its holders H for presenting work pieces 145 to the buffing action of the buff wheels B, the conveyor, as shown in Figs. 1 and 2, includes a generally rectangular horizontal guideway 146 for the holder H at approximately table height which is supported at the four corners by standard or leg members 147. Each of the members 147 has a smooth quarter-circle cross section and is surmounted by a quarter-circle portion 146a of the guideway 146.

Adjacent ends of the curved guideway sections 146a are in alignment and support connecting straight sections 146b, the cross section of which (Fig. 17) is substantially identical with the cross section through each of the four corner quarter-round sections 146a.

In accordance with the invention, the straight guideway sections 146b are one or multiples of identical lengths which are readily securable together in rigid multiple lengths. Thus, for example, the straight sections at the ends of the conveyor C may be single lengths and the side sections double lengths, as shown in Fig. 1. Similarly the quarter-round corner sections 146a are identical so that the machine may be enlarged readily and the conveyor correspondingly enlarged with a minimum of effort and expense.

Figure 17:
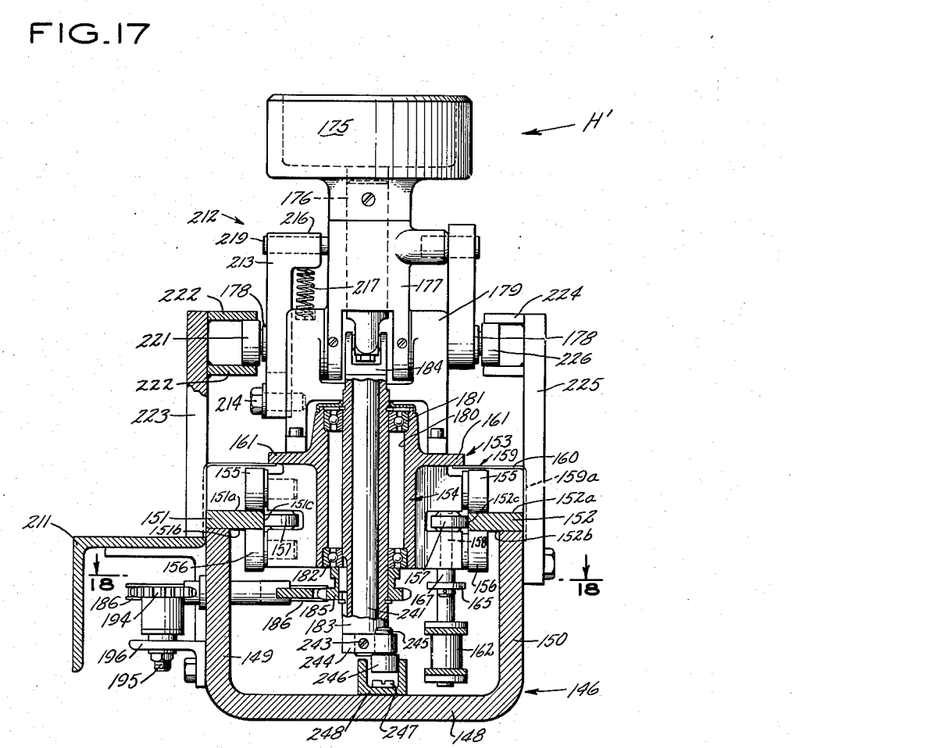
Fig. 17 is an enlarged view partly in cross-sectional view taken generally on line 17—17 of Fig. 1 showing conveyor mechanism.

As shown in Fig. 17, the guideway 146 is a channel member having a U-shaped cross section and includes a horizontal bottom wall portion 148 and spaced vertical side wall portions 149 and 150 to the upper edges of which are securely fastened a pair of inwardly extending spaced horizontal guide members 151 and 152 that support and guide a carrier portion, generally designated 153, of the work holder H in the endless generally rectangular path of the conveyor C shown in Fig. 1.

More particularly as shown in Figs. 1 and 17, the carrier 153 includes a generally rectangular body portion 154 to which are rotatably secured four pairs of rollers 155, 156. The four upper rollers 155 are at the sides of the carrier body 154 adjacent the four corners and provide rolling support for the carriage on the upper surfaces 151a and 152a of the track members 151 and 152. The lower rollers 156 are directly beneath the upper rollers 155 and maintain rolling engagement with the undersurfaces 151b and 152b of the guide track members 151 and 152. Between each pair of rollers 155, 156 is a roller 157 which rotates about a pin 158 vertically disposed in the carriage body 154 so that the rollers 157 at the four corners maintain rolling engagement with the vertical inner surfaces 151c, 152c and properly center the carriage 153 in traveling along the guide tracks 151, 152.

Preferably side walls 159a of L-shaped channel members 159 are fastened to the side walls 149 and 150 of the guide track 146 so that side walls 160 of the channel members 159 extend under horizontal flange portions 161 of the carriage body 154 so as to safely enclose the rollers 155, 156 and 157.

While only one such carriage 153 may be provided, generally it will be found advisable to have a continuous series of identical carriages all the way around the track 146 and preferably in end to end engagement with each other except for the clearance which occurs when the carriages are at the corners 146a.

Regardless of the number of carriages 153, each is advanced by a chain 162 which is carried within the guideway 146 by four sprockets 163 located at the four corners.

In accordance with the present invention, the length of the guide surface 152c for the carriages 153 must be greater than the length of the endless chain 162 to avoid carriage interference at the corners 146a. Pivotally secured to the chain 162 at spaced intervals substantially equal to the length of the carriage 153 are offset links 165. The hole 166 in the free end of each of the links 165 is adapted to receive a pin 167 which is secured to and depends from the underside of the carriage body 154 so that the links 165 couple the carriages 153 to the chain 162 for travel therewith.

In accordance with the present invention, the carriages 153 may be advanced continuously or by a smooth shock-free indexing motion at any interval and for any amount of dwell so that the work pieces 145 on the carriages may be present to the action of the buff wheels B in any of three characteristic patterns—continuous rotary, indexing rotary and straight line, as desired.

Complete and positive control is exercised in positioning and/or moving work at each buff wheel B regardless of what is done at any subsequent wheel. It is possible to achieve a combination of work motions and speeds which not only combines but exceeds the individual features of conventional machines.

Figures 15, 16, 18, 22:
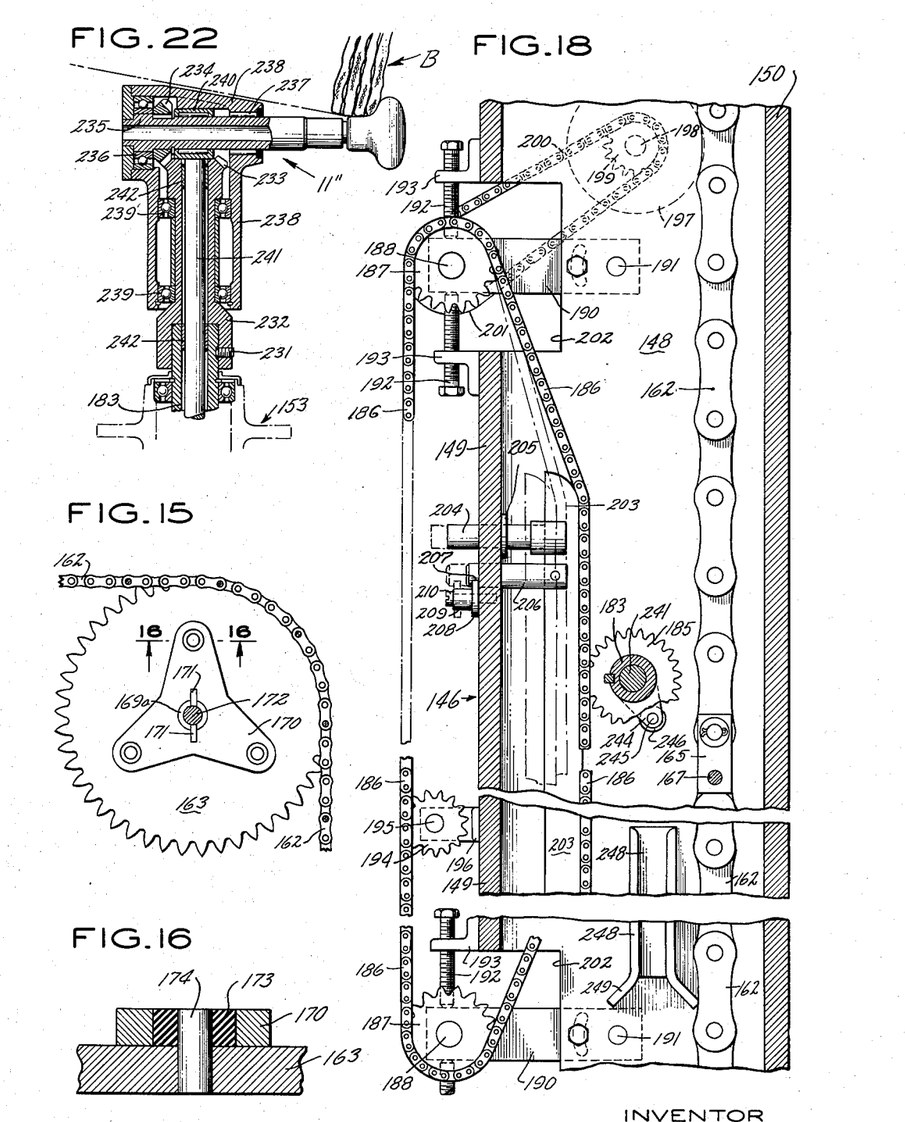
Fig. 15 is an enlarged plan view of a drive sprocket and driving arm for the conveyor.
Fig. 16 is an enlarged cross-sectional view taken on line 16—16 of Fig. 15 showing the shock proof coupling of the drive sprocket and arm.
Fig. 18 is a cross-sectional view taken on line 18—18 of Fig. 17 showing the work holder rotating drive.
Fig. 22 is view in vertical cross-section of a modified work holder.

More particularly, the drive for the chain 162 which advances the carriages 153 includes an electric motor 168 and a selectively variable speed reducer 169 which drive a vertical shaft 169a on which one of the four sprockets 163 is rotatably mounted. As shown in Fig. 15, the upper end of the shaft 169a carries a triple arm member 170 to which it is keyed for rotation therewith by shear keys 171 which are held in place by a cap plug 172.

The outer ends of the three arms of member 170 contain rubber gaskets 173 which, as shown in Fig. 16, provide a shock-free resiliently cushioned drive to the sprocket 163 through concentric pins 174. The other three sprockets 163 for the chain 162 are freely rotatable on idler shafts (not shown).

Numerous different work holders may be associated with the carriages 153. Each of the carriages shown in Figs. 1 and 2 has four spindle holders H, each of which is adapted to support an individual tumbler for buffing by the wheels B. It however will be understood that a carriage may have a lesser or greater number of holders and the holders may be adapted to effect different movements of a work piece at different buff stations.

Figure 19:
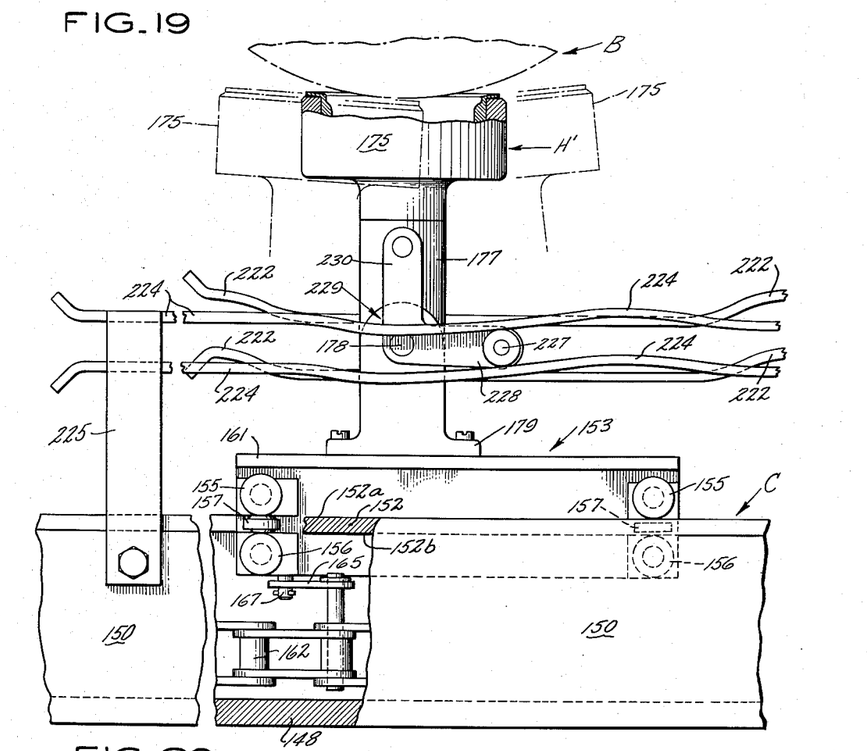
Fig. 19 is side elevation of a portion of the conveyor and work holder as viewed from right of Fig. 17.

The holder H', shown in Fig. 17, is illustrative of a number of these movements. More particularly, the holder H' includes a cup-shaped fixture 175 with which a work piece may be automatically tilted to receive and leave a buff at one station, as shown in Fig. 19, and rotated at another station.

The holder 175 is rotatably journaled by a shaft 176 to which it is secured in a vertical bearing sleeve 177 that is secured by a bracket 179 secured to the horizontal flanges 161 of the carriage 153 and pins 178 for pivotal movement about a horizontal axis located transverse of the carriage 153.

Extending vertically upward through the carriage 153 is an individual bore 180 for each fixture 175 in which are upper and lower bearing races 181 and 182 which rotatably support a vertical sleeve 183 which is operably connected by a universal joint 184 to the fixture shaft 176.

Adjacent the lower end of the sleeve 183 and fixed thereto is a sprocket 185 which may be driven by a chain 186 to rotate the fixture 175 at any desired speed.

As shown in Fig. 18, the chain 186 is carried by a pair of sprockets 187 which are rotatably mounted on a pair of vertical shafts 188 each of which is secured as by a nut to the outer end of a lever 190, the inner end of which is pivotally secured as by bolt 191 to the bottom 148 of the guide track 146. Screws 192 carried by brackets 193, which are secured to the guide wall 149, bear against opposite sides of the pivotally supported lever arms 190 and restrain them in desired positions for proper tensioning of the chain 186. One or more idler sprockets 194 for the chain 186 may be provided on pins 195 secured by brackets 196 to the wall 149 of the guide track 146. Advancement of the chain 186 is effected at any desired speed by a motor 197 to the shaft 198 of which is secured a sprocket 199 which drives a chain 200 and sprocket 201 to which is secured one of the sprockets 187 on one of the shafts 188. The guide track walls 148 and 149 are cut away, as at 202, so that the sprocket 199 and chain 200 are housed within the guide track 146 and the chain 186 extends through the wall 149 adjacent the sprockets 187 and into engagement with the spindle sleeve sprocket 185.

As shown in Figs. 17 and 18, the chain drive 186 rides on and is supported by a shoe 203 throughout the extent of the engagement of the chain with the sprocket 185. Adjacent each end of the shoe is secured a pin 204 which extends rearwardly through a bushing 205 in the guide track wall 149 so as to locate the shoe in alignment with the chain at the same elevation as the sprocket 185.

Additional pins 206 are secured to the shoe 203 adjacent each pin 204. Each pin 206 is notched at 207 to receive a shoulder flange 208 of a bushing 209 which is secured to the wall 149 by a screw 210 and holds the shoe 203 in its proper position for operative engagement of the sprocket 185 with the shoe supported portion of the chain 186. The chain 186 may be driven in either direction at any selected speed and either continuously or intermittently to effect a desired rotation of the sprocket 185 and of the holder H' and its work piece relative to the buff B. Moreover, the chain 186 may be held stationary so as to provide in effect a rack for rotating the sprocket 185 when the holder carriage 153 advances on the track 146 and holding the work against rotation when the carriage 153 is stationary.

When it is desired that the chain 186 not engage and drive the sprocket 185, the bushing 209 is turned end-for-end so that the bush flange 208 engages the slot 207 in the retracted position of the pin 206, shown in phantom in Fig. 18, and the chain 186 is moved out of the path of the sprocket 185.

As shown in Fig. 17, a skirted safety shield 211 preferably guards the portion of the chain 186 which is outside the guide track 146 from the top and side.

It should be understood that the drive chain 186 and drive motor 197 may be duplicated for any and all of the four straight sections of the guide track 146 and that, if desired, several chains 186 may be interconnected and driven by a single motor. Normally one of the four straight sections of the track 146 is used for loading and unloading work pieces from the holder fixtures and is not provided with the chain 186 for rotating the holders. However, the drive chain 186 may be provided in combination with an operable pressure or other member (not shown) which holds the work piece against rotation while the chain 186 rotates the work piece holder H to thereby automatically screw or unscrew a work piece and a cooperatively threaded holder.

Figure 20:
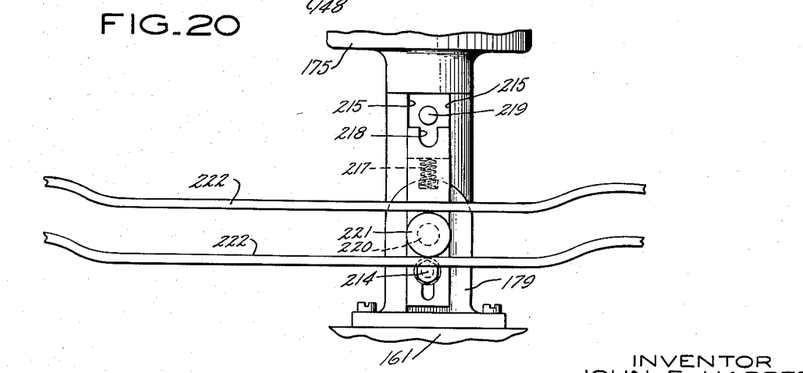
Fig. 20 is a partial view similar to Fig. 19 as viewed from the left of Fig. 17 showing work holder latching and unlatching mechanism.

The holder sleeve 177 is releasably secured in its vertically upright position, shown in Figs. 17 and 20, by a latch generally designated 212 which includes a slotted latch bolt 213 slidably supported by a bolt 214 in a vertical guideway 215 in the side of the bracket 179. The upper end 216 of the bolt 213 is forced upwardly by a spring 217 so that groove 218 in the upper end 216 of the latch bolt retains a pin 219 which fixedly projects from the sleeve 177 of the holder H' and thereby holds the sleeve vertically upright, or in any other position which may be selected by relocation of the pin 219.

In order to retract the latch bolt 213 and free the sleeve 177 for pivotal movement about the axis of the pins 178, there is secured to the bolt 213 by a stud 220, a cam roller 221 which, with travel of the carriage 153, moves into and out of a cam track 222 which is secured by supports 223 to the guide track 146.

In accordance with the invention, means are provided for controlling the pivotal tilting movement of the sleeve 177 and its holder H' while the bolt 213 is unlatched by the cam track 222. More particularly as shown in Figs. 17 and 19, a second cam track 224 is secured by supports 225 to the guide track wall 150 and is adapted to control the tilting movement of the holder sleeve 177 by receiving and controlling the path of a cam roller 226 which is rotatably secured by a stud 227 on arm 228 of a bell crank 229. The bell crank is pivotally secured on one of the pins 178 on which the sleeve 177 is pivoted and arm 230 of the bell crank is pivotally pinned to the sleeve 177. Before the cam follower 226 leaves the cam track 224, the track returns and holds the sleeve 177 upright while the cam track 222 returns the latch bolt 213 into latching engagement with the pin 219.

It will be apparent that while the described tilting movement is about an axis transversely disposed relative to the travel of the holder H', the axis of the pivotal movement may extend in the direction of the travel or be at any angular or oblique position which may be best suited to the shape of the work to be tiltably presented to the buff B.

Fig. 22 shows a work holder H'' which provides for rotation of the work piece about a horizontal axis and for controllably oscillating and indexing the axis of rotation relative to the carriage. The operations may be effected successively or concurrently as desired and, if a work piece requires, may be combined with tilt or otherwise modified.

As shown in Fig. 22, the drive sleeve 183 is secured, as by a set screw 231, to a sleeve 232 having a bevel gear 233 which drives a bevel gear 234 that is keyed to a horizontal shaft 235 which is rotatably supported by a race 236 and needle bearings 237 in a housing 238. The housing 238 also is supported by spaced races 239 about the sleeve 232. A bracket 240 within the housing 238 couples the housing to a shaft 241 which extends downwardly through and is rotatably supported in the sleeve 232 (Fig. 22) and the aligned sleeve 183 (Figs. 17 and 22) by bushings 242. Secured to the lower end of the shaft 241, as by set screw 243, is a crank arm 244 to the outer end of which is secured a pin 245 on which is rotatably fastened a cam roller 246.

As shown in Figs. 17 and 18, fastened to the bottom 148 of the guide track 146, as by screws 247, is a cam track 248, which like all of the cam tracks has a spread or flared entrance 249 with which to capture the cam roller 246 as the carriage 153 advances along the guide track 146 regardless of the position of the crank arm 244. Thereafter the cam roller 246 is guided by the track 248 to index or oscillate the shaft 235 about the axis of the shaft 241.

The versatility of the machine and the manner of its operation is apparent from the foregoing description.

Preparatory to operating the machine, each of the buff head assemblies A is properly located relative to the conveyor C so as to contact a desired portion of each work piece as it is presented to the buff wheel B by the work holder H of the conveyor.

Generally, the adjusted position of each buff assembly A is that in which the axis of the turret 34 is normally and centrally disposed relative to the location of the area of the work piece at which buffing contact is to be established with the buff wheel B. When thus adjusted, advancement of the turret 34 by the motor 46 subjects the work to substantially the same buffing action even though the buff wheel B becomes considerably smaller as the result of wear.

The proper adjustment is made in part by properly locating the blocks 17 on the horizontal tubular supports 12, the chains 20 being used to move the blocks to the selected positions.

The adjustment also requires properly elevating and angularly positioning the vertical supports 13 and properly locating the trunion supporting blocks 22 and 23 on the vertical supports 13, all of which adjustments may be facilitated by supporting the blocks 22 and 23 in selected positions with the chain hoists 30.

The adjustment further requires the proper indexing of the yoke or trunnion 15 by means of the worm 24 and worm wheel 28. Finally, the adjustment is completed by indexing the buff supporting turret 34 relative to the yoke 15 by means of the adjustment lock 52.

The buff assemblies A may be located on either or both sides of the conveyor C at each station. Additional frame structure, generally designated 250, may be provided to support one or more additional buff assemblies A which cannot be properly located on the main supporting tubular members 12. The work pieces are presented by the holders H to each of the buffs B for buffing along the conveyor C.

Figure 21:
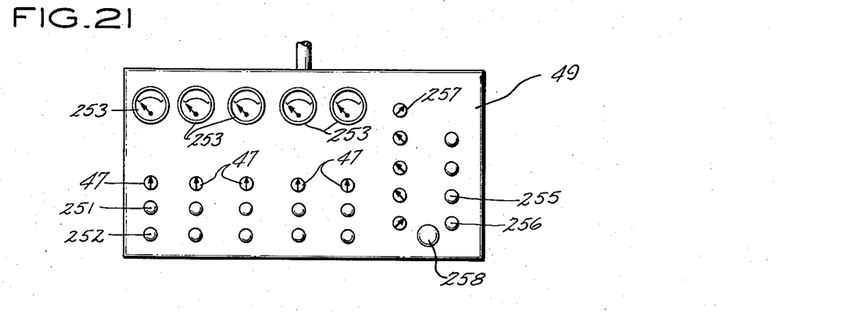
Fig. 21 is a front view of a control panel shown in Fig. 2.

As shown in Fig. 21, individual "start" and "stop" switch buttons 251 and 252 are provided for each of the buff motors 61 which drives a buff wheel B. Associated with the pair of buttons 251, 252 for each motor 61 is an individual ammeter 253 which indicates the load current on the motor. When the ammeter reading falls below a value corresponding to proper load on the buff B, the selector switch 47 beneath the ammeter 253 is turned to "advance" position and the motor 46 is thereby operated to advance the turret 34 and its buff wheel B. When the ammeter indicates the desired buff load has been re-established, the switch selector 47 is returned to its center or "off" position and stops the motor 46.

The selector 47 is set at its "retract" position to reverse the motor 46 and retract the buff B whenever a worn buff is replaced with a new one of larger diameter.

The conveyor motor 168 may be manually stopped and started by a pair of switch buttons 255 and 256 shown at the right of the panel in Fig. 21. Moreover, an individual selector 257 may be provided for selectively operating each spindle drive motor 197 in both directions and for stopping the motor as desired. Moreover, all of the motors may be controlled and operated by an automatic timer (not shown) in any sequence and combination pattern required by the particular work piece.

A safety switch 258 on the panel (Fig. 21) operates a main circuit breaker which disconnects all power from the machine.

It will be apparent that the present invention provides a high production automatic machine for polishing and buffing all types and shapes of articles.

Moreover, it is a relatively low cost machine having the necessary strength and durability for long and hard usage.

The machine has complete flexibility and adaptability to substantially every possible position and portion of a work piece. Each buff assembly A is adjustably mounted so that its buff B may be advanced in any selected plane which may be proper to compensate for buff wear. Moreover, the work holder H on the conveyor C may be adjusted and operated in any desired position and with substantially any desired motion. The adjustability of both the work holder H and the buff head assemblies A give virtually complete flexibility.

The individual power drive and the overhead suspension for each buff head assembly is substantially in balance regardless of angular settings and adjustment and assures accuracy of operation.

The buffing compound applicator of the present invention for automatically applying cold compound to the buff and in regulable preselected uniform quantity and time intervals along the same line of application adds to the accuracy and uniformity of the machine operation.

While the present invention has been more or less specifically illustrated and described, it should be understood that changes may be resorted to within the scope of the appended claims and that the components and operation may be modified as required, all within the scope of the claims.

I claim:

1. An applicator for dressing a buff wheel with compound including a circularly curved holder for conformingly curved compound cake, said holder being operably supported for pivotal movement about the axis of the curve of the holder, means for oscillating the support about the axis, and means for advancing the curved cake relative to the holder responsive to oscillation of the holder so that the line of approach remains the same.

2. In a buffing machine, a frame having a plurality of overhead parallel horizontal supports, an endless conveyor selectively movable, continuously and intermittently in substantially a single horizontal plane beneath the horizontal frame supports, a pair of elongate parallel supporting members depending from a pair of the horizontal supports, means for adjusting the positions of the depending members relative to the horizontal members including the distance the elongate members extend beneath the horizontal supports and the angular direction of each depending member relative to the axis of its supporting horizontal member in a vertical plane at right angles to said axis and further including adjustment means for selecting the vertical plane for the angular adjustment of each depending member, a buff head assembly support adjustably secured to the pair of depending members, means for adjusting the elevation of the assembly support and for angularly adjusting the assembly support about an axis at right angles to the pair of parallel elongate depending supports, a turret mounted for both rotary and longitudinally reciprocal adjustment relative to an axis in a plane parallel with the depending members, means for advancing and retracting the turret selectively on the turret axis, a buff wheel generally centrally located relative to said turret axis and operably supported by said turret for rotation about a buff wheel axis located at right angles to the turret axis, a motor carried by said turret for rotating the buff, an applicator carried by said turret for dressing the buff with compound, means for oscillating said applicator cyclically out of compound dressing engagement with the buff, automatic means for advancing compound in the applicator responsive to the oscillation of the applicator, said buff head assembly including the turret, buff motor and applicator for all positions of adjustment being substantially in balance about the assembly support axis and the turret axis, and a plurality of work holders on said conveyor for presenting work pieces successively to the buff for buffing each of said holders including means for rotating a work piece on the conveyor and for oscillating the work piece about the axis angularly disposed to the axis of rotation of the work piece.

3. In a buffing machine, including a frame, a support mounted for angular adjustment about a first axis, means for moving the support linearly along said first axis to desired positions of adjustment, universally adjustably mounting means for universal selection of said first axis relative to said frame, and a buff wheel operably mounted on said support for rotation about its axis.

4. A buffing machine as recited in claim 3 and wherein the axis of the buff wheel is disposed substantially in a plane containing said first axis.

5. A buffing machine as recited in claim 3 and wherein the axis of the buff wheel is disposed substantially at right angles to said first axis.

6. A buffing machine as recited in claim 3 and wherein means for rotating said buff wheel are operably mounted on said support for movement therewith.

7. In a buffing machine, a frame having a plurality of overhead parallel horizontal supports, an endless conveyor selectively movable, continuously and intermittently in substantially a single horizontal plane beneath the horizontal frame supports, a pair of elongated parallel supporting members depending from a pair of the horizontal supports, means for adjusting the positions of the depending members relative to the horizontal members including the distance the elongate members extend beneath the horizontal supports and the angular direction of each depending member relative to the axis of its supporting horizontal member in a vertical plane at right angles to said axis and further including adjustment means for selecting the vertical plane for the angular adjustment of each depending member, a buff head assembly support adjustably secured to the pair of depending members, means for adjusting the elevation of the assembly support and for angularly adjusting the assembly support about an axis substantially at right angles to the pair of parallel elongate depending supports, a turret mounted for both rotary and longitudinally reciprocal adjustment relative to an axis in a plane parallel with the depending members, means for advancing and retracting the turret selectively on the turret axis, a buff wheel generally centrally located relative to said turret axis and operably supported by said turret for rotation about a buff wheel axis located at right angles to the turret axis, and means carried by said turret for rotating the buff.

8. In a buffing machine, a frame having a plurality of overhead parallel horizontal supports, an endless conveyor selectively movable continuously and intermittently in substantially a single horizontal plane beneath the horizontal frame supports, a pair of elongate parallel supporting members depending from a pair of the horizontal supports, means for adjusting the positions of the depending members relative to the horizontal members including the distance the elongate members extend beneath the horizontal supports and the angular direction of each depending member relative to the axis of its supporting horizontal member in a vertical plane at right angles to said axis and further including adjustment means for selecting the vertical plane for the angular adjustment of each depending member, a buff head assembly support adjustably secured to the pair of depending members, means for adjusting the elevation of the assembly support and for angularly adjusting the assembly support about an axis at right angles to the pair of parallel elongate supports, and operably supported by said assembly support.

9. In a buffing machine, a buff wheel, a movable support for said buff wheel, means for moving said support to compensate for buff wear, an applicator for dressing the buff wheel with compound including a holder for curved compound cake, said holder being operably supported on said movable support for pivotal movement about the axis of the curve of the cake, means for oscillating the holder about the axis, and means for advancing the curved cake relative to the holder in the direction of said movement of the cake responsive to oscillation of the holder.

References Cited in the file of this patent
UNITED STATES PATENTS

| | | |
|---|---|---|
| 525,939 | Beairsto et al. | Sept. 11, 1894 |
| 928,254 | Gail | July 20, 1909 |
| 1,139,054 | Morris et al. | May 11, 1915 |
| 1,205,314 | Adams | Nov. 21, 1916 |
| 1,319,921 | Bock | Oct. 28, 1919 |
| 1,394,704 | Bernhart | Oct. 25, 1921 |
| 1,449,458 | Sutermeister | Mar. 27, 1923 |
| 1,851,566 | Crowley | Mar. 29, 1932 |
| 1,857,832 | Bailey | May 10, 1932 |
| 1,859,275 | Bailey | May 24, 1932 |
| 2,070,322 | Sperry | Feb. 9, 1937 |
| 2,110,931 | Dyer et al. | Mar. 15, 1938 |
| 2,145,961 | Whitehouse | Feb. 7, 1939 |
| 2,170,687 | Johnson | Aug. 22, 1939 |
| 2,177,992 | Moon | Oct. 31, 1939 |
| 2,251,161 | Packer et al. | July 29, 1941 |
| 2,259,870 | Ahnert | Oct. 21, 1941 |
| 2,324,416 | Murray | July 13, 1943 |
| 2,325,701 | Murray | Aug. 3, 1943 |
| 2,409,340 | Bohler | Oct. 15, 1946 |
| 2,435,622 | Fielding | Feb. 10, 1948 |
| 2,626,487 | Janusauskas | Jan. 27, 1953 |
| 2,635,394 | Wing | Apr. 21, 1953 |